(12) United States Patent
Chhour

(10) Patent No.: US 9,631,702 B2
(45) Date of Patent: Apr. 25, 2017

(54) GEARBOX WITH REDUCED BACKLASH

(71) Applicant: Goodrich Actuation Systems SAS, Buc (FR)

(72) Inventor: Bertrand Chhour, Paris (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 47 days.

(21) Appl. No.: 14/845,434

(22) Filed: Sep. 4, 2015

(65) Prior Publication Data

US 2016/0069424 A1    Mar. 10, 2016

(30) Foreign Application Priority Data

Sep. 5, 2014  (EP) ..................................... 14306369

(51) Int. Cl.
| | | |
|---|---|---|
| *F16H 3/44* | (2006.01) | |
| *F16H 1/28* | (2006.01) | |
| *F16H 1/32* | (2006.01) | |
| *B64C 13/24* | (2006.01) | |

(52) U.S. Cl.
CPC ............ *F16H 1/2863* (2013.01); *B64C 13/24* (2013.01); *F16H 1/32* (2013.01); *F16H 3/44* (2013.01); *F16H 2001/2872* (2013.01)

(58) Field of Classification Search
None
See application file for complete search history.

(56) References Cited

U.S. PATENT DOCUMENTS

| | | | | |
|---|---|---|---|---|
| 4,430,909 A | * | 2/1984 | Magnuson | ............... B66D 1/22 254/344 |
| 2005/0130792 A1 | | 6/2005 | Drago et al. | |
| 2013/0324354 A1 | * | 12/2013 | Phebus | ................. F16H 1/2818 475/348 |
| 2014/0194245 A1 | * | 7/2014 | During | .................... F16H 48/36 475/331 |
| 2015/0267777 A1 | * | 9/2015 | Shin | ......................... F16H 1/46 475/332 |

FOREIGN PATENT DOCUMENTS

| | | |
|---|---|---|
| DE | 2032723 A1 | 4/1971 |
| EP | 2636924 A1 | 9/2013 |

OTHER PUBLICATIONS

European Search Report for application No. EP14306369.1; Mailing Date Feb. 12, 2015, 4 pages.

* cited by examiner

*Primary Examiner* — Justin Holmes
(74) *Attorney, Agent, or Firm* — Cantor Colburn LLP

(57) ABSTRACT

A gearbox includes two axially spaced epicyclic gear trains, each having a sun gear, axially spaced planet gears carried by a planet carrier, and a ring gear fixed to the gear box. One of the planet gears engages with the fixed ring gear, and another of the planet gears engages with an output ring gear. The sun gears of the two gear trains are mounted on a single shaft. The planet carriers of the two gear trains are mounted on a shaft so that they can freely rotate but have limited axial motion along the shaft. The two output ring gears are helical gears of opposite handedness.

12 Claims, 2 Drawing Sheets

GEARBOX WITH REDUCED BACKLASH

FOREIGN PRIORITY

This application claims priority to European Patent Application No. 14306369.1 filed Sep. 5, 2014, the entire contents of which is incorporated herein by reference.

TECHNICAL FIELD

The present disclosure relates to a gearbox for a flight control actuator.

BACKGROUND

Flight control actuators are used in aircraft to move control surfaces (rudder, elevators and ailerons). Currently, it is mainly linear actuators which are used with elevators and ailerons, because of the very low backlash inherent in linear actuators.

However, if a linear actuator is used, the tailplane or wing carrying the elevator or aileron must be capable of accommodating the linear actuator at full extension, which requires a considerable amount of space inside the tailplane or wing to be set aside for the linear actuator.

The present disclosure seeks to address this issue.

SUMMARY

There is disclosed herein a gearbox, including: two axially spaced epicyclic gear trains, each epicyclic gear train having: a sun gear, a plurality of axially spaced planet gears, which rotate as one and are carried by a planet carrier, and a ring gear fixed to the gearbox; wherein one of the plurality of axially spaced planet gears engages with the sun gear and the ring gear, and wherein another of the plurality of axially spaced planet gears engages with an output ring gear; wherein the sun gears of the two epicyclic gear trains are mounted on a single input shaft extending in an axial direction; wherein the planet carriers of the two epicyclic gear trains are mounted on an axial shaft so that they can freely rotate around the shaft but their axial motion along the shaft is limited; and wherein the said other of the plurality of the axially spaced planet gears and the output ring gear of each epicyclic gear train are formed as helical gears, with the helical pitch being the same for both gear trains and the handedness being different.

The diameters of the said one of the plurality of axially spaced planet gears and the said other of the plurality of axially spaced planet gears may be different in each gear train.

The diameter of the said one of the plurality of axially spaced planet gears may be smaller than the diameter of the said other of the plurality of axially spaced planet gears.

Each planet carrier may be mounted on the axial shaft between a pair of stops, each stop limiting the movement of the planet carrier along the axial shaft.

The pair of stops may abut against the planet carrier to prevent movement of the planet carrier along the axial shaft.

Each planet carrier may be mounted between a pair of stops with play, and each of the planet carriers may be urged against a stop.

Each planet carrier may be urged in a direction such that the said helical other of the plurality of the axially spaced planet gears and the helical output ring gear are pushed to mesh.

The planet carriers may be urged by springs or by Belleville washers.

The springs or Belleville washers may be positioned between the planet carriers of the two epicyclic gear trains to urge them outwardly.

The springs or Belleville washers may be positioned between a plate on an end of the axial shaft and a planet carrier to urge the planet carrier inwardly.

There is also disclosed herein a flight control actuator incorporating a gearbox as specified above.

BRIEF DESCRIPTION OF THE DRAWINGS

Some exemplary embodiments of the present disclosure will now be described way of example only and with reference to FIGS. 1 to 4, of which.

DETAILED DESCRIPTION

Figure 1:
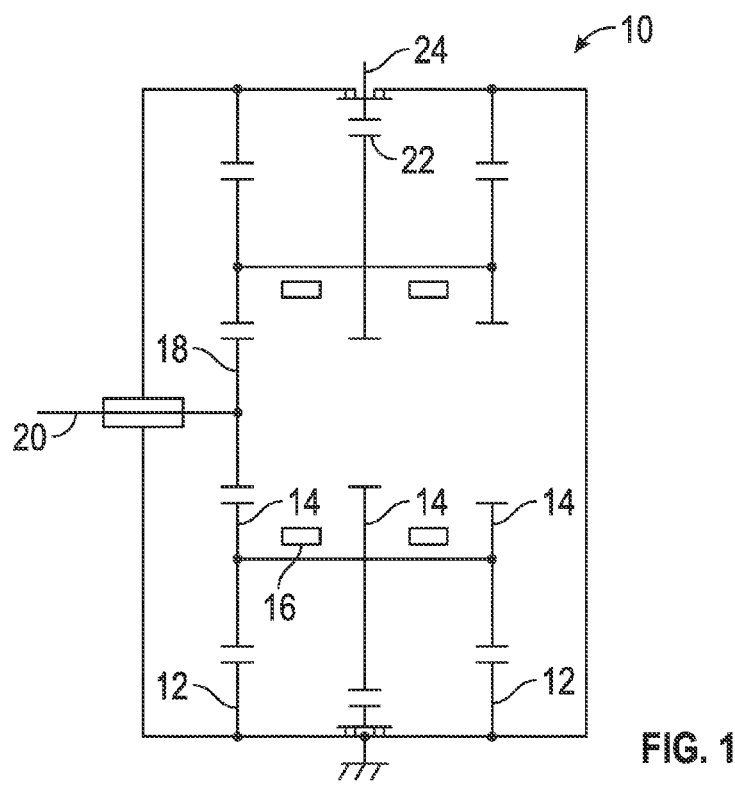
FIG. 1 shows a gearbox with a single compound gear train.

FIG. 1 shows a gearbox 10 which includes a planetary gear train. The gearbox is fixed in position, and ring gears 12 (two in the illustrated example) are fixed to an inner side of a wall of the gearbox 10. A number of sets of planet gears 14 (three in the illustrated example) are carried by a planet carrier 16, and two sets of the planet gears 14 mesh with the ring gears 12. One of these sets of planet gears 14 also meshes with a sun gear 18, which is connected to an input shaft 20. The set of planet gears 14 which does not mesh with a ring gear 12 instead meshes with an output gear 20, which is connected to an output shaft 22 which passes through the wall of the gearbox 10 between the ring gears 12.

Figure 2:
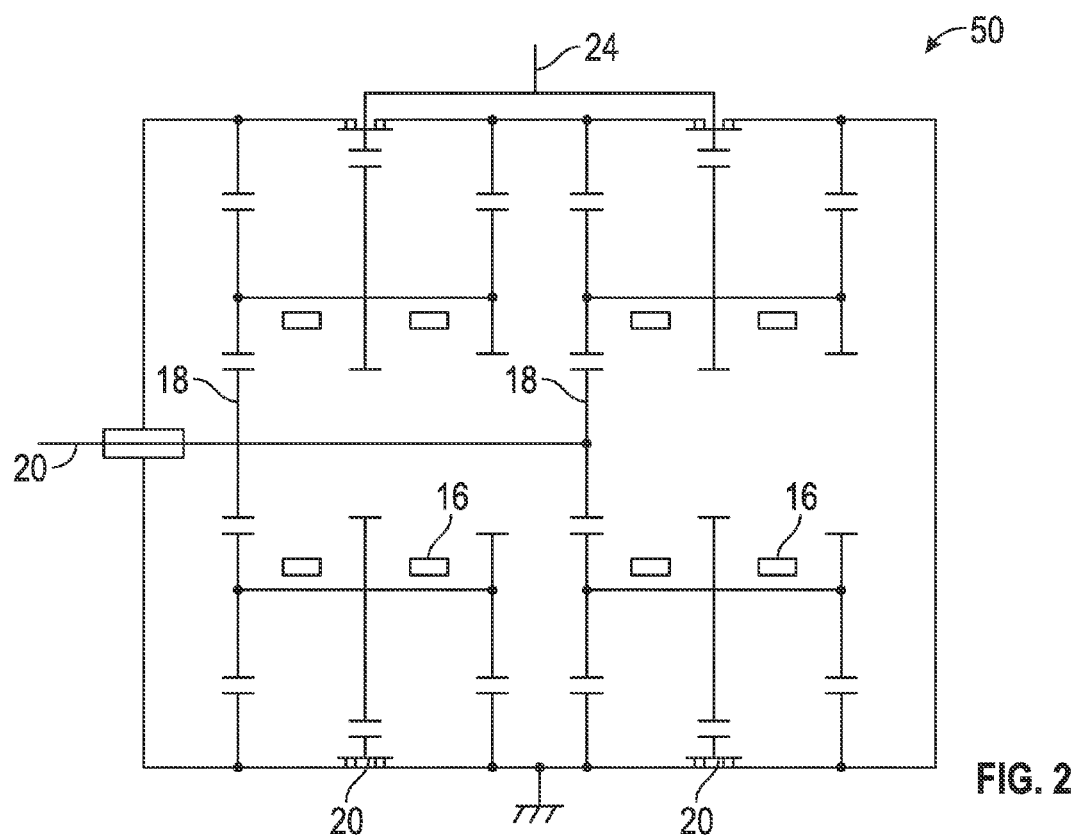
FIG. 2 shows a gearbox with two compound gear trains.

The torque capacity of this gearbox is limited, and can be increased by providing two gear trains in parallel in a single gearbox 50, as shown in FIG. 2. As can be seen from this Figure, the input shaft 20 now carries two sun gears 18, there are two planet carriers 16 each of which carries three sets of planet gears 14, and there are two output gears 20 connected to a single output shaft 24.

However, although the gearbox of FIG. 2 provides an increased torque capacity, the torque capacity of the gearbox of FIG. 2 is not necessarily double that of the gearbox of FIG. 1. Because of manufacturing tolerances, the two gear trains which are combined to form the single gearbox of FIG. 2 will not be absolutely identical, and in particular, each will have its own backlash. As a result, when the input shaft 20 starts to turn, the differing amounts of backlash in the two gear trains means that the planet gears 14 of one of the two gear trains will come into contact with the output gear 20 before the planet gears 14 of the other gear train come into contact with their output gear 20.

Figure 3:
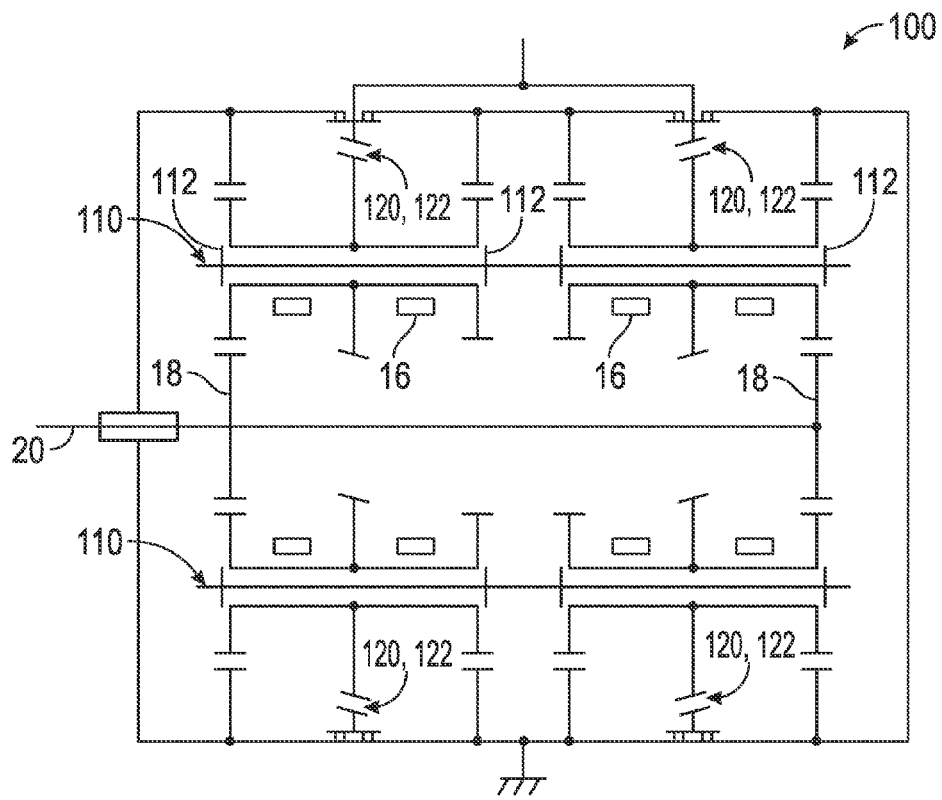
FIG. 3 shows a gearbox with two compound gear trains according to one embodiment of the present disclosure.

To ensure that both gear trains transmit torque, in a gearbox 100 according to this disclosure the planet carriers 16 of the two gear trains are connected together by load catching shafts 110, which can move axially within the gearbox 100. As shown in FIG. 3, stops 112 are formed on the shafts 110 at each side of the planet carriers 16, so that the planet carriers 16 cannot move axially along the shafts 110, but are free to rotate about the shafts 110. Further, the central planet gears 120 on each carrier 16 are formed as helical gears, as are the output gears 122. The helical engagements of the two gear trains are of equal angle but opposite handedness.

With this arrangement, if the central planet gears 120 of one gear train come into contact with the output gear 122 before the central planet gears 120 of the other gear train do so, the helical engagement will tend to push the first set of central planet gears 120 to one side (in a direction to disengage with the output gear 122). This will push the first planet carrier 16 sideways, and it will engage with the stop 112 on the load catching shaft 110 and push the load catching shaft 110 sideways. In turn, this will pull the second planet carrier 16 along, as a result of the contact between the stop 112 and the planet carrier 16, and the central planet gear 120 of the second planet carrier 16 will be pulled into engagement with the second output gear 122. Thus, the helical engagement of one set of central planet gears 120 with the output gear 122 will force the other set of central planet gears 120 to engage with the other output gear 122, and ensure that torque is transmitted equally through both gear trains without backlash.

Figure 4:
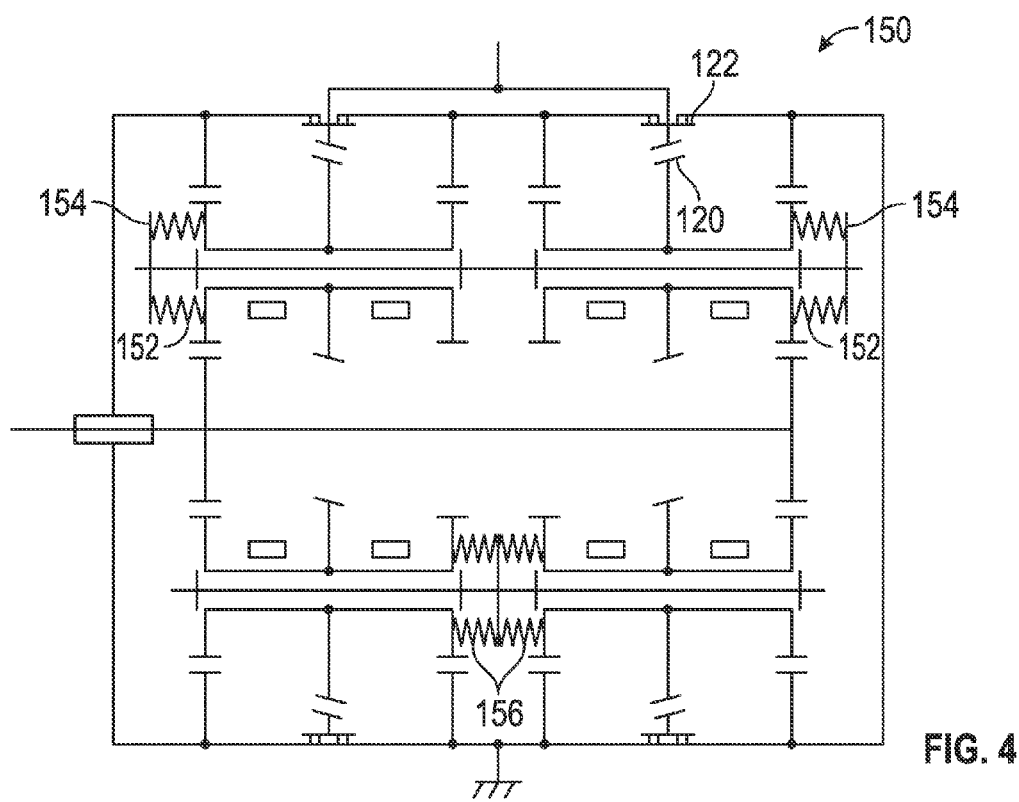
FIG. 4 shows a gearbox with two compound gear trains according to a second embodiment of the present disclosure.

A preload can be applied to the planet carriers 16, to urge the helical central planet gears 120 into engagement with the helical output gears 122, and an arrangement which achieves this is shown in FIG. 4. As shown in the top half of FIG. 4, springs 152 can be mounted between the outer sides of the planet carriers 16 and plates 154 attached to the ends of the load catching shafts 110, to push the planet carriers 16 inwardly. Alternatively, as shown in the bottom half of FIG. 4, springs 156 can be mounted between the planet carriers 16, to push the planet carriers 16 outwardly. The springs can be replaced by Belleville washers.

The preload further reduces the backlash in the gearbox. In order to move the output gear, the gearbox must overcome the preload and any external load.

Because of the very low backlash provided by at least some embodiments described above, the gearbox can be used as part of a rotary flight control actuator, which will be more compact than the linear flight control actuators previously used.

The invention claimed is:

1. A gearbox, including:
   two axially spaced epicyclic gear trains, each epicyclic gear train having:
   a sun gear,
   a plurality of axially spaced planet gears, which rotate as one and are carried by a planet carrier, and
   a ring gear fixed to the gearbox;
   wherein one of the plurality of axially spaced planet gears engages with the sun gear and the ring gear, and
   wherein another of the plurality of axially spaced planet gears engages with an output ring gear;
   wherein the sun gears of the two epicyclic gear trains are mounted on a single input shaft extending in an axial direction;
   wherein the planet carriers of the two epicyclic gear trains are mounted on an axial shaft so that they can freely rotate around the shaft but their axial motion along the shaft is limited; and
   wherein the said other of the plurality of the axially spaced planet gears and the output ring gear of each epicyclic gear train are formed as helical gears, with the helical pitch being the same for both gear trains and the handedness being different.

2. The gearbox of claim 1, wherein the diameters of the said one of the plurality of axially spaced planet gears and the said other of the plurality of axially spaced planet gears are different in each gear train.

3. The gearbox of claim 2, wherein the diameter of the said one of the plurality of axially spaced planet gears is smaller than the diameter of the said other of the plurality of axially spaced planet gears.

4. The gearbox of claim 1, wherein each planet carrier is mounted on the axial shaft between a pair of stops, each stop limiting the movement of the planet carrier along the axial shaft.

5. The gearbox of claim 4, wherein the pair of stops abut against the planet carrier to prevent movement of the planet carrier along the axial shaft.

6. The gearbox of claim 4, wherein each planet carrier is mounted between a pair of stops with play, and each of the planet carriers is urged against a stop.

7. The gearbox of claim 6, wherein each planet carrier is urged in a direction such that the said helical other of the plurality of the axially spaced planet gears and the helical output ring gear are pushed to mesh.

8. The gearbox of claim 6, wherein the planet carriers are urged by springs.

9. The gearbox of claim 6, wherein the planet carriers are urged by Belleville washers.

10. The gearbox of claim 8, wherein the springs or Belleville washers are positioned between the planet carriers of the two epicyclic gear trains to urge them outwardly.

11. The gearbox of claim 8, wherein the springs or Belleville washers are positioned between a plate on an end of the axial shaft and a planet carrier to urge the planet carrier inwardly.

12. A flight control actuator incorporating the gearbox of claim 1.

* * * * *